US012665480B2

(12) United States Patent
Chen et al.

(10) Patent No.: US 12,665,480 B2
(45) Date of Patent: Jun. 23, 2026

(54) VIBRATION MOTOR WITH ELASTIC SUPPORT MEMBERS WITH FIXING PORTIONS ON BEVELED EDGE OF A CORNER OF THE MASS

(71) Applicant: AAC Microtech (Changzhou) Co., Ltd., Changzhou (CN)

(72) Inventors: Weibo Chen, Changzhou (CN); Xiaorong Zhou, Changzhou (CN); Ziyang Zhang, Changzhou (CN); Jie Wu, Changzhou (CN)

(73) Assignee: AAG Microtech (Changzhou) Co., Ld., Changzhou (CN)

( * ) Notice: Subject to any disclaimer, the term of this patent is extended or adjusted under 35 U.S.C. 154(b) by 213 days.

(21) Appl. No.: 18/395,778

(22) Filed: Dec. 26, 2023

(65) Prior Publication Data

US 2024/0348138 A1     Oct. 17, 2024

Related U.S. Application Data

(63) Continuation of application No. PCT/CN2023/087514, filed on Apr. 11, 2023.

(51) Int. Cl.
*H02K 33/02* (2006.01)
*H02K 1/12* (2006.01)

(52) U.S. Cl.
CPC ............... *H02K 33/02* (2013.01); *H02K 1/12* (2013.01)

(58) Field of Classification Search
CPC ........ H02K 33/00; H02K 33/02; H02K 33/04; H02K 33/06; H02K 33/16; H02K 33/18; H02K 35/00; H02K 35/02; H02K 35/04; H02K 35/06

USPC ...................................................... 310/15–28
See application file for complete search history.

(56) References Cited

U.S. PATENT DOCUMENTS

| | | | | |
|---|---|---|---|---|
| 6,323,568 | B1 * | 11/2001 | Zabar ..................... | F04B 17/042 |
| | | | | 310/12.24 |
| 8,368,268 | B2 * | 2/2013 | Hasegawa ............ | G02B 21/248 |
| | | | | 359/381 |
| 10,129,655 | B2 * | 11/2018 | Zhu .......................... | H04R 9/02 |
| 10,160,010 | B2 * | 12/2018 | Chun ..................... | H02K 33/16 |
| 10,447,133 | B2 * | 10/2019 | Jin .......................... | H02K 33/18 |
| 10,491,090 | B2 * | 11/2019 | Zu .......................... | H02K 33/16 |
| 10,547,233 | B2 * | 1/2020 | Jin .......................... | H02K 5/04 |
| 10,886,827 | B2 * | 1/2021 | Liu ........................ | H02K 33/14 |
| 11,043,888 | B2 * | 6/2021 | Tang ..................... | H02K 33/16 |

(Continued)

*Primary Examiner* — Maged M Almawri
(74) *Attorney, Agent, or Firm* — Wiersch Law Group

(57) ABSTRACT

A vibration motor is provided, including: a housing including a pair of side walls, a vibrator including a mass block, a pair of elastic support members disposed at both ends of the vibrator, and a stator. The mass block includes a pair of corners diagonally disposed. Each corner includes a first side edge, a second side edge, and a beveled edge. Each elastic support member includes a first fixing portion fixed to a respective beveled edge, a straight edge portion curved and extending from the first fixing portion in a direction away from a respective first side edge and close to a respective second side edge, a second fixing portion fixed to a respective side wall away from the corresponding corner, and a curved portion connecting the straight edge portion and the second fixing portion. The vibration motor in the present disclosure is capable of improving performance.

7 Claims, 3 Drawing Sheets

(56)  References Cited

U.S. PATENT DOCUMENTS

| | | | | |
|---|---|---|---|---|
| 11,309,808 B1 * | 4/2022 | Li | H02K 35/02 | |
| 2010/0302752 A1 * | 12/2010 | An | H02K 33/06 | |
| | | | | 361/807 |
| 2011/0133577 A1 * | 6/2011 | Lee | H02K 33/18 | |
| | | | | 310/15 |
| 2011/0316361 A1 * | 12/2011 | Park | H02K 33/16 | |
| | | | | 310/25 |
| 2014/0035397 A1 * | 2/2014 | Endo | H02K 33/18 | |
| | | | | 310/30 |
| 2015/0137628 A1 * | 5/2015 | Endo | H02K 33/16 | |
| | | | | 310/25 |
| 2016/0164389 A1 * | 6/2016 | Jang | H02K 7/116 | |
| | | | | 310/20 |
| 2016/0181900 A1 * | 6/2016 | Xu | H02K 33/04 | |
| | | | | 310/12.27 |
| 2016/0181902 A1 * | 6/2016 | Xu | H02K 33/18 | |
| | | | | 310/17 |
| 2017/0033651 A1 * | 2/2017 | Mao | H02K 33/16 | |
| 2017/0110920 A1 * | 4/2017 | Mao | H02K 1/34 | |
| 2018/0234771 A1 * | 8/2018 | Hsieh | H02K 33/12 | |
| 2018/0250107 A1 * | 9/2018 | Dai | H02K 1/2791 | |
| 2019/0044425 A1 * | 2/2019 | Zu | H02K 33/02 | |
| 2019/0151895 A1 * | 5/2019 | Takahashi | B06B 1/045 | |
| 2020/0044545 A1 * | 2/2020 | Tang | H02K 33/16 | |
| 2022/0209636 A1 * | 6/2022 | Shao | H02K 33/02 | |
| 2023/0253865 A1 * | 8/2023 | Huang | H02K 5/24 | |
| | | | | 310/15 |
| 2023/0253868 A1 * | 8/2023 | Yan | H02K 33/18 | |
| | | | | 310/28 |

* cited by examiner

100

1

11

Y

X

Z

VIBRATION MOTOR WITH ELASTIC SUPPORT MEMBERS WITH FIXING PORTIONS ON BEVELED EDGE OF A CORNER OF THE MASS

CROSS-REFERENCE TO RELATED APPLICATION

The present application is a continuation of PCT Patent Application No. PCT/CN2023/087514, filed Apr. 11, 2023, which is incorporated by reference herein in its entirety.

TECHNICAL FIELD

The present disclosure relates to the field of vibration motors, and more particularly to a vibration motor applied in a portable electronic product.

BACKGROUND

A vibration motor in related technologies includes a housing, a vibrator accommodated in the housing, and a pair of V-shaped elastic support members for suspending the vibrator in the housing, and the V-shaped elastic support members have good rigidity, which ensure a vibration mode of the vibrator. However, due to large-angle bending of the V-shaped elastic support members, the V-shaped elastic support members are prone to fatigue and insufficient deformation capacity during operation, resulting in poor performance of the vibration motor.

Therefore, it is necessary to provide a new vibration motor to solve the above technical problems.

SUMMARY

The present disclosure aims to overcome the above technical problems and provide a vibration motor capable of improving performance.

In order to realize the above object, the present disclosure provides a vibration motor, including a housing, a vibrator accommodated in the housing, a pair of elastic support members fixed to the housing and suspending the vibrator in the housing, and a stator fixed to the housing for driving the vibrator to vibrate along a first direction, where the vibrator includes a mass block, and the mass block includes a pair of corners that are diagonally disposed; where each of the pair of corners includes a first side edge extending along the first direction, a second side edge extending along a second direction perpendicular to the first direction, and a beveled edge connecting the first side edge and the second side edge; where the pair of elastic support members are respectively disposed at both ends of the vibrator along the first direction, and the housing includes a pair of side walls extending along the first direction; and where each of the pair of elastic support members includes a first fixing portion fixed to a respective beveled edge of a corresponding one of the pair of corners, a straight edge portion curved and extending from the first fixing portion in a direction away from a respective first side edge of the corresponding one of the pair of corners and close to a respective second side edge of the corresponding one of the pair of corners, a second fixing portion fixed to a respective side wall away from the corresponding one of the pair of corners, and a curved portion connecting the straight edge portion and the second fixing portion.

As an improvement, the pair of elastic support members are disposed centrosymmetrically.

As an improvement, the mass block is provided with a through-hole penetrating along a third direction perpendicular to the first direction and the second direction, the vibrator further includes a magnetic circuit system accommodated in the through-hole, and the stator is accommodated in the through-hole and disposed in relative spacing from the magnetic circuit system.

As an improvement, the stator includes a pole shoe fixed to the housing and a coil wound on the pole shoe.

As an improvement, the magnetic circuit system includes magnet portions respectively disposed at both ends of the stator along the first direction and at both sides of the stator along the second direction, and each of the magnet portions includes a pole shank fixed to the mass block and a magnetic steel fixed to the pole shank.

As an improvement, both an outer surface of the first fixing portion and an outer surface of the second fixing portion are provided with a solder sheet.

As an improvement, the vibration motor further includes a limiting block fixed to the housing for limiting displacement of the vibrator along the first direction.

In the vibration motor of the present disclosure, the mass block is provided with corners, and each elastic support member includes the first fixed portion fixed to the respective beveled edge of the corresponding one of the pair of corners, the straight edge portion curved and extending from the first fixing portion in the direction away from the respective first side edge of the corresponding one of the pair of corners and close to the respective second side edge of the corresponding one of the pair of corners, the second fixing portion fixed to the respective side wall away from the corresponding one of the pair of corners, and the curved portion connecting the straight edge portion and the second fixing portion. The elastic support members are fixed to the corresponding corners of the mass block, which save space. In addition, the elastic support members have good rigidity, which ensure the vibration mode of the vibrator. Meanwhile, the bending angle of the elastic support member is small, which is not easy to fatigue, and has good deformation capacity, thus improving the performance of the vibration motor.

BRIEF DESCRIPTION OF THE DRAWINGS

To illustrate the technical solutions in the embodiments of the present disclosure more clearly, the accompanying drawings used for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The technical solutions in the embodiments of the present disclosure are described clearly and completely in the following with reference to the accompanying drawings in the embodiments of the present disclosure. Apparently, the described embodiments are only some but not all of the embodiments of the present disclosure. Based on the embodiments in the present disclosure, all other embodiments obtained by a person of ordinary skill in the field without creative efforts fall within the protection scope of the present disclosure.

Figure 1:
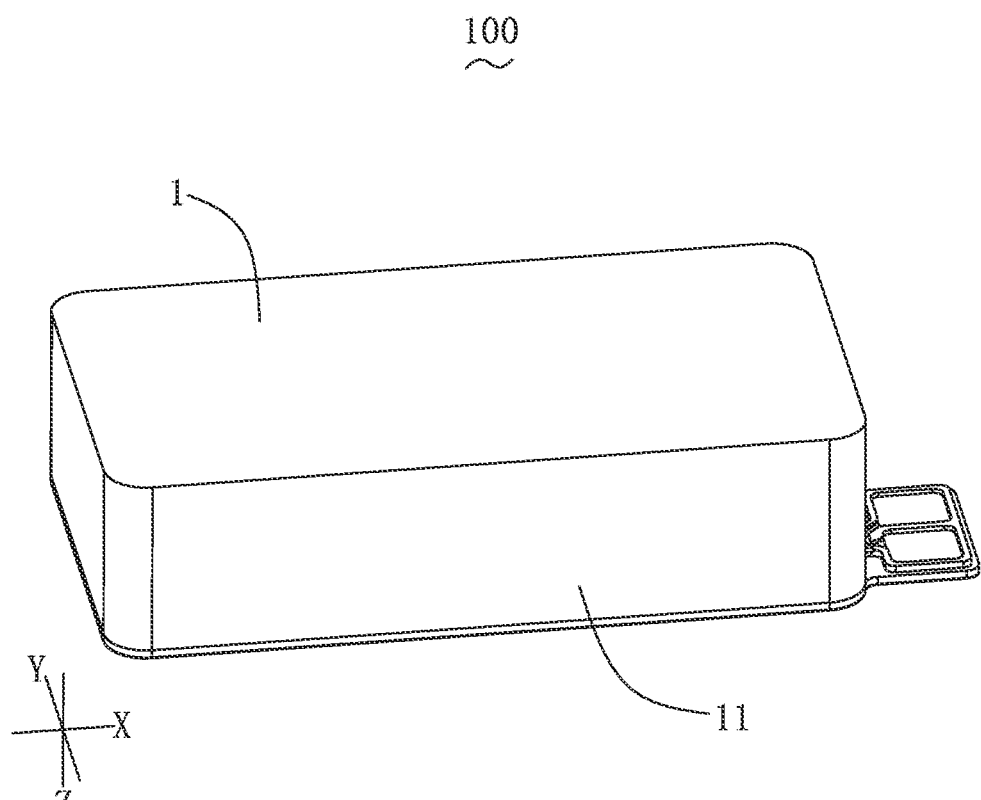
FIG. 1 shows a three-dimensional view of a vibration motor provided in the present disclosure.
Figure 2:
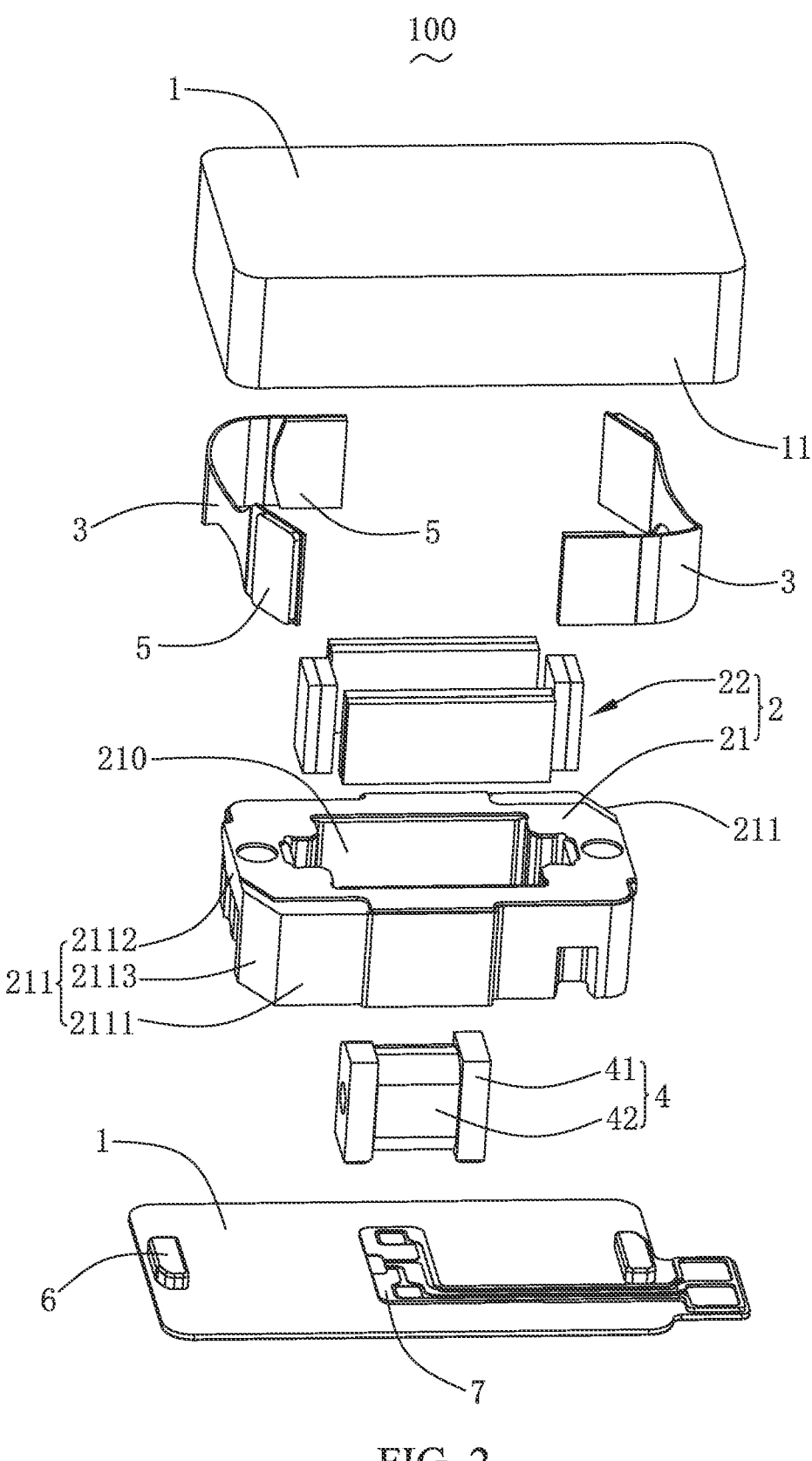
FIG. 2 shows a three-dimensional exploded view of the vibration motor shown in FIG. 1.
Figure 3:
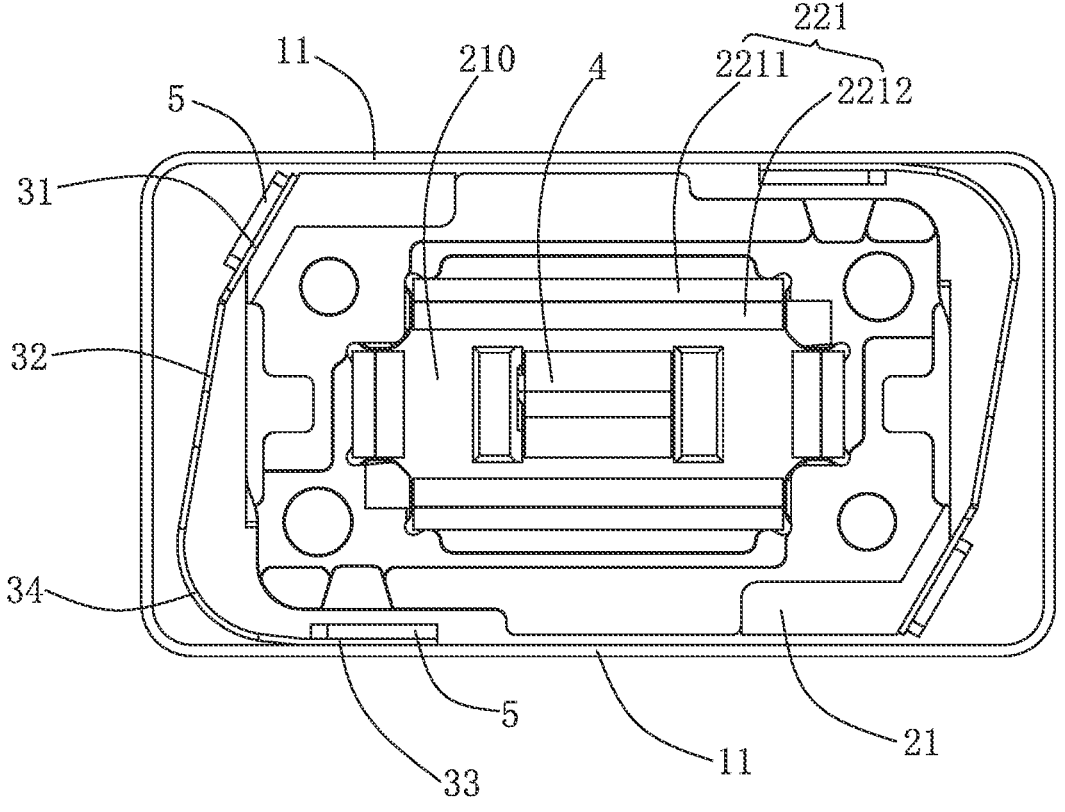
FIG. 3 shows an assembly schematic diagram of a stator, a vibrator, an elastic support member, a solder sheet and a part of a housing of the vibration motor shown in FIG. 1.

Referring to FIG. 1 to FIG. 3, the present disclosure provides a vibration motor 100. The vibration motor 100 includes a housing 1, a vibrator 2 accommodated in the housing 1, a pair of elastic support members 3 fixed to the housing 1 and suspending the vibrator 2 in the housing 1, and a stator 4 fixed to the housing 1 for driving the vibrator 2 to vibrate along a first direction X.

The pair of elastic support members 3 are respectively disposed at both ends of the vibrator 2 along the first direction X.

The vibrator 2 includes a mass block 21. The mass block 21 includes a pair of corners 211 that are diagonally disposed, and each corner 211 includes a first side edge 2111 extending along the first direction X, a second side edge 2112 extending along a second direction Y perpendicular to the first direction X, and a beveled edge 2113 connecting the first side edge 2111 and the second side edge 2112.

The housing 1 includes a pair of side walls 11 extending along the first direction X.

Each elastic support member 3 includes a first fixing portion 31 fixed to a respective beveled edge 2113 of a corresponding one of the pair of corners 221, a straight edge portion 32 curved and extending from the first fixing portion 31 in a direction away from a respective first side edge 2111 of the corresponding one of the pair of corners 211 and close to a respective second side edge 2112 of the corresponding one of the pair of corners 211, a second fixing portion 33 fixed to a respective side wall 11 away from the corresponding one of the pair of corners, and a curved portion 34 connecting the straight edge portion 32 and the second fixing portion 33. Both an outer surface of the first fixing portion 31 and an outer surface of the second fixing portion 33 are provided with a solder sheet 5.

As an improvement, the pair of elastic support members 3 are disposed centrosymmetrically.

The mass block 21 is provided with a through-hole 210 penetrating along a third direction Z perpendicular to the first direction X and the second direction Y. The vibrator 2 further includes a magnetic circuit system 22 accommodated in the through-hole 210, and the stator 4 is accommodated in the through-hole 210 and disposed in relative spacing from the magnetic circuit system 22.

The stator 4 includes a pole shoe 41 fixed to the housing 1 and a coil 42 wound on the pole shoe 41.

The magnetic circuit system 22 includes magnet portions 221 respectively disposed at both ends of the stator 4 along the first direction X and at both sides of the stator 4 along the second direction Y. Each magnet portion 221 includes a pole shank 2211 fixed to the mass block 21 and a magnetic steel 2212 fixed to the pole shank 2211.

The vibration motor 100 further includes a limiting block 6 fixed to the housing 1 for limiting displacement of the vibrator 2 along the first direction X, and a circuit board 7 fixed to the housing 1 for supplying power to the coil 42.

In the vibration motor of the present disclosure, the mass block is provided with corners, and each elastic support member includes the first fixed portion fixed to the respective beveled edge of the corresponding one of the pair of corners, the straight edge portion curved and extending from the first fixing portion in the direction away from the respective first side edge of the corresponding one of the pair of corners and close to the respective second side edge of the corresponding one of the pair of corners, the second fixing portion fixed to the respective side wall away from the corresponding one of the pair of corners, and the curved portion connecting the straight edge portion and the second fixing portion. The elastic support members are fixed to the corresponding corners of the mass block, which save space. In addition, the elastic support members have good rigidity, which ensure the vibration mode of the vibrator. Meanwhile, the bending angle of the elastic support member is small, which is not easy to fatigue, and has good deformation capacity, thus improving the performance of the vibration motor.

The above description is only the embodiments of the present disclosure, it should be noted that, for the person of ordinary skills in this field, improvements can also be obtained without departing from creation concepts of the present disclosure, which all belong to the protection scope of the present disclosure.

What is claimed is:

1. A vibration motor comprising a housing, a vibrator accommodated in the housing, a pair of elastic support members fixed to the housing and suspending the vibrator in the housing, and a stator fixed to the housing for driving the vibrator to vibrate along a first direction, wherein the vibrator includes a mass block, and the mass block includes a pair of corners that are diagonally disposed; wherein each of the pair of corners includes a first side edge extending along the first direction, a second side edge extending along a second direction perpendicular to the first direction, and a beveled edge connecting the first side edge and the second side edge, wherein the beveled edge is a plane surface which is not parallel to either the first direction or the second direction; wherein the pair of elastic support members are respectively disposed at both ends of the vibrator along the first direction, and the housing includes a pair of side walls extending along the first direction; and wherein each of the pair of elastic support members includes a first fixing portion with a flat plate shape fixed to a respective beveled edge of a corresponding one of the pair of corners, a straight edge portion curved and extending from the first fixing portion in a direction away from a respective first side edge of the corresponding one of the pair of corners and close to a respective second side edge of the corresponding one of the pair of corners, a second fixing portion fixed to a respective side wall away from the corresponding one of the pair of corners, and a curved portion connecting the straight edge portion and the second fixing portion.

2. The vibration motor according to claim 1, wherein the pair of elastic support members are disposed centrosymmetrically.

3. The vibration motor according to claim 1, wherein both an outer surface of the first fixing portion and an outer surface of the second fixing portion are provided with a solder sheet.

4. The vibration motor according to claim 1, wherein the vibration motor further includes a limiting block fixed to the housing for limiting displacement of the vibrator along the first direction.

5. The vibration motor according to claim 1, wherein the mass block is provided with a through-hole penetrating along a third direction perpendicular to the first direction and the second direction, the vibrator further includes a magnetic circuit system accommodated in the through-hole, and the stator is accommodated in the through-hole and disposed in relative spacing from the magnetic circuit system.

6. The vibration motor according to claim 5, wherein the stator includes a pole shoe fixed to the housing and a coil wound on the pole shoe.

7. The vibration motor according to claim 5, wherein the magnetic circuit system includes magnet portions respectively disposed at both ends of the stator along the first direction and at both sides of the stator along the second direction, and each of the magnet portions includes a pole shank fixed to the mass block and a magnetic steel fixed to the pole shank.

\* \* \* \* \*